Patented July 25, 1933

1,920,160

UNITED STATES PATENT OFFICE

HERMAN ALEXANDER BRUSON, OF GERMANTOWN, PENNSYLVANIA, ASSIGNOR TO THE RESINOUS PRODUCTS & CHEMICAL CO. INC. OF PHILADELPHIA, PENNSYLVANIA

COATING COMPOSITION CONTAINING A SICCATIVE

No Drawing. Original application filed January 23, 1932, Serial No. 588,499. Divided and this application filed September 15, 1932. Serial No. 633,271.

The following invention describes autoxidizable coating compositions containing as a siccative, a polyvalent metal salt of acids having the formula R—O—CH$_2$—COOH wherein R denotes any one of the following groups or radicles:

(a) An alkyl group having more than five carbon atoms.

(b) An aryl group bearing at least one alkyl side chain substituent which has more than four carbon atoms in a normal straight chain.

(c) A hydroaromatic radicle.

This application is a division of my co-pending U. S. application, Serial No. 588,499 filed January 23, 1932.

I have found that the polyvalent metal salts of acids having the above general formula are readily soluble in a large variety of organic solvents such as alcohols, esters, hydrocarbons and vegetable or animal oils, as more completely described in the above co-pending application of which the present invention is a division. When incorporated with drying or semi-drying oils, or with paints, varnishes, "alkyd" resins (made from polycarboxylic acids, such as phthalic, polyhydric alcohols, such as glycerol and drying oils or drying oil fatty acids) printing inks, oil enamels, and the like which are derived from drying oils and which for the sake of brevity are referred to herein as "autoxidizable compositions"; these metal salts act catalytically to accelerate the rate of drying of such autoxidizable materials.

Typical examples of the acids whose polyvalent metal salts come within the scope of this invention are the following:

(a) n-hexyloxyacetic acid, sec-hexyloxyacetic acid, n-heptyloxyacetic acid, n-octyl-oxyacetic acid, capryloxyacetic acid, decyloxyacetic acid, and their homologues or isomeric alkoxyacetic acids.

(b) para-n-amylphenoxyacetic acid, para-sec-amylphenoxyacetic acid, para-sec-hexylphenoxyacetic acid, para-sec-octylphenoxyacetic acid, octylcresoxyacetic acid, sec-amylnaphthoxyacetic acid.

(c) Cyclohexyloxyacetic acid, methylcyclohexyloxyacetic acid, menthyloxyacetic acid, fenchyloxyacetic acid, bornyloxyacetic acid, terpinoxyacetic acid.

These acids may be readily prepared by condensing monochloracetic acid or its alkali metal salts with the corresponding alcoholate or phenate or an alkali metal:

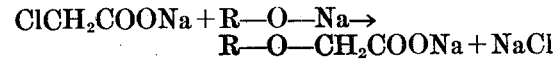

and acidifying the reaction product after removing any excess of alcoholic or phenolic compound. The acids are then converted into their polyvalent metal salts by any of the well known methods of forming salts. For use as siccatives, the principal salts of the above acids which come under consideration are the bismuth, cadmium, cerium, chromium, cobalt, copper, iron, lead, manganese, mercury, nickel, thallium, tin uranium, vanadium and zinc salts.

Some of the other salts notably the aluminum, barium, calcium, magnesium, strontium and titanium may also be used as siccatives, or as resins which harden the film, even though their catalytic activity as siccatives is less than those of the first mentioned group of metal salts. When added in small quantities to autoxidizable coating compositions, especially, oleoresinous varnishes, any of the above salts or mixtures thereof will accelerate the speed of drying, but not all in the same degree. For practical purposes it has been found desirable to employ preferably the cobalt, manganese, and lead salts, since by the use of these three salts in various proportions or admixed with each other, suitable acceleration of the drying rate can be attained.

From the point of view of cheapness and availability, the more important salts are those of the alkoxyacetic acids having the formula R—O—CH$_2$—COOH wherein R is an alkyl group higher than amyl, and is preferably heptyl, octyl, monyl or decyl; having either a straight or branched chain. Some of these alkyl groups are present in the monohydric alcohols containing 6 to 16 carbon atoms such as are present in the alcohols boiling above 150° C. which are obtained as by-products in the manufacture of synthetic methanol by the catalytic action of hydrogen upon carbon monoxide and which consist essentially of primary and secondary saturated monohydric alcohols such as di-isopropyl carbinol, 2-methylpentanol-1, 4-methylhexanol-1, 2,4-dimethylhexanol-1 4-methylheptanol-1, 2,4-dimethylpentanol-3; 5-methylhexanol-3; 2,4-dimethylpentanol-1, and their homologues and insomers. The alkoxyacetic acids prepared from these alcohols individually or in admixture with each other, as normally obtained from the fraction of higher alcohols boiling at 157°–250° C. which are formed in the catalytic synthesis of methanol from hydrogen and carbon monoxide, are especially suitable for conversion into their polyvalent (metal salts) and heavy metal salts for use as siccatives since the latter are very soluble in oils and hydrocarbons. Similarly, the higher alcohols containing over 5 carbon atoms which are derived from the catalytic reduction of fatty oils or fatty acids such as cocoanut oil, or of cocoanut oil esters, such as n-hexyl-, heptyl-, octyl-, nonyl, decyl-, undecyl-, duodecyl, and cetyl alcohols either individually or in admixture with each other may be converted into the corresponding alkoxyacetic acids and these in turn into their polyvalent metal salts and heavy metal salts for use as siccative in autoxidizable compositions. Alcohols such as dicapryl alcohol, tricapryl alcohol, dihexyl alcohol, diamyl alcohol, and the like which are obtainable by heating respectively capryl alcohol, sec-hexyl alcohol and sec-amyl alcohol at temperatures around 300–400° C. preferably with alkalies or alkali metals and other catalysts are likewise suitable for this purpose. The advantages of these siccatives over those of the known art are lighter color, higher solubility in drying oils, higher degree of stability on storage or when dispersed in oils and resinous compositions and less tendency toward after yellowing in white pigmented paints, varnishes or oil enamels.

These new salts when anhydrous, are reaility soluble in hydrocarbons of aromatic, aliphatic, or hydroaromatic nature such as benzene, hexane, petroleum naphthas, kerosene, or turpentine. They may furthermore be readily dispersed at 100–150° C., or in some cases at room temperature, in drying or semi-drying animal oil or vegetable oils such as raw and bodied linseed oil, tung oil, fish oils, perilla oil, soya bean oil, rape seed oil, rubber seed oil, castor oil and in paints, varnishes, printing inks and enamels prepared therefrom with or without the addition of resinous, pigments, and thinners. They are also soluble in non-drying oils and waxes such as olive oil, paraffin oil, petrolatum, paraffin wax and the like. In addition, these salts can be added to solutions of synthetic resins of the phenol-aldehyde type, and "alkyd" resins especially those more recent synthetic resins of autoxidizable nature which are prepared by condensing phthalic anhydride (or other polybasic organic acid) with glycerol and drying oils and/or drying oil fatty acids.

When thus incorporated, the above polyvalent metal salts, more especially the cobalt, manganese and lead salts of acids of the type R—O—CH$_2$—COOH as described above act as rapid accelerators of drying when the autoxidizable composition is exposed to the air in the form of a thin film as protective coating.

In practicing this invention the following examples are given:

Example 1

Air drying varnish

Resin (ester gum or modified phenol-formaldehyde resin) _____ 100 lb.
Raw tung oil _____ 20 gal.
Linseed oil (medium bodied) _____ 10 gal.
Varnish makers' naphtha _____ 50 gal.

The varnish was made by heating the resin and the tung oil to 560° F. adding 5 gals. of the linseed oil and heating to body at 500° F. Then check with the other 5 gals. of linseed oil, and on cooling thin down with the naphtha. This varnish will still be tacky after 24–48 hours and will give a frosted film. However, if there is added to the varnish a solution of 5 pounds lead capryloxyacetate (lead content=1.65 lbs.) and 0.54 pound cobalt capryloxyacetate (cobalt content=.07 lb.) dissolved in petroleum naphtha, the above varnish will dry hard and tack-free in at the most, 10 hours.

In place of the cobalt capryloxyacetate, an equal amount of manganese capryloxyacetate may similarly be used. These weights of siccative correspond to 0.7% metallic lead and 0.03% cobalt based on the weight of the drying oils present.

In a similar manner one may employ equivalent amounts (based on the metal content) of other cobalt, manganese, and lead salts of any of the other acids of the type R—O—CH$_2$—COOH enumerated herein, more particularly the alkoxy-acetates derived from octyl and higher alcohols.

Example 2

Baking varnish

Resin (modified ester gum type) __ 150 lb.
Tung oil _____ 10 gal.
Linseed oil _____ 5 gal.
Varnish makers' naphtha _____ 33 gal.

The varnish is prepared by heating the resin and the tung oil to 560° F. Then add 3 gal. linseed oil and body at 500° F. Add 2 gal. linseed oil and reduce at 450° F. with the naphtha. When cool add a naphtha solution of 1.77 lbs. of lead alkoxy-acetate and 0.18 lb. manganese alkoxyacetate, made from the mixed alkoxyacetic acids derived from the 157–195° C. boiling fraction of higher monohydric alcohols obtained in the manufacture of synthetic methanol from hydrogen and carbon monoxide, said alcohols consisting principally of branched chain octanols. The above alkoxyacetates contain 33% metallic lead and 13% metallic manganese respectively and the amount used on the weight of the drying oil is 0.5% lead and 0.2% manganese as calculated on the above weights given.

This addition of siccative will reduce the baking time at 150° F. by one half, to give a hard dry film.

*Example 3*

An "alkyd" resin made by heating 200 grams phthalic anhydride with 170 grams linseed oil fatty acids and 118 grams glycerin for 12½ hours at 180–185° C. and having an acid number equal to 14 is dissolved in an equal weight of solvent consisting of 50% xylene and 50% varnish makers' naphtha. To this is added 0.54 grams cobalt octylphenoxyacetate dissolved in 5 grams of xylene. The varnish will now dry at least twice as fast as it does without the cobalt salt.

Mixtures of any of the other polyvalent metal salts of the above acids such as the mixed manganese-zinc, cobalt-zinc, etc. may likewise be employed as siccatives according to the well known methods.

Other autoxidizable composition especially those adapted for coating materials may be similarly treated to accelerate their drying, such as drying oils themselves, printing inks, etc. The polyvalent metal salts may be incorporated directly in oils or varnishes by warming the mixture to 150–160° C. and may therefore be added directly to varnishes on the down heat as is the custom with the well known siccatives.

These salts may also be added as resins or hardening agents to other coating compositions such as nitrocellulose which are not strictly of autoxidizable nature. For example, to a lacquer made from 20 parts nitrocellulose, 40 parts butyl acetate, and 40 parts toluene (by weight) there may be added 10 parts by weight of aluminum or zinc capryloxyacetate. A clear solution is obtained which gives a transparent, colorless film of good hardness and adhesion.

What I claim is:

1. In the process of accelerating the rate of drying of auto-oxidizable coating compositions, the step which comprises incorporating therein a polyvalent metal salt of an acid having the formula R—O—CH$_2$COOH wherein R is one of the group consisting of alkyl radicles having more than five carbon atoms; a hydro-aromatic radicle; and an aryl group bearing at least one alkyl side chain substituent which has more than four carbon atoms in a normal straight chain.

2. In the process of accelerating the rate of drying of auto-oxidizable coating compositions, the step which comprises incorporating therein a metal salt of an acid having the formula R—O—CH$_2$—COOH wherein R is one of the group consisting of alkyl radicles having more than five carbon atoms; a hydroaromatic radicle; and an aryl group bearing at least one alkyl side chain substituent which has more than four carbon atoms in a normal straight chain; the metal radicle of which is a member of the group consisting of aluminum, bismuth, cadmium, calcium, cerium, chromium, cobalt, copper, iron, lead, manganese, mercury, nickel, thallium, tin, uranium, vanadium and zinc.

3. In the process of accelerating the rate of drying of autoxidizable coating compositions, the step which comprises incorporating therein a heavy metal salt of an acid having the formula R—O—CH$_2$—COOH wherein R is one of the group consisting of alkyl radicles having more than five carbon atoms; a hydro-aromatic radicle; and an aryl group bearing at least one alkyl side chain substituent which has more than four carbon atoms in a normal straight chain.

4. In the process of accelerating the rate of drying of autoxidizable compositions derived from drying oils, the step which comprises incorporating therewith, a polyvalent metal salt of an alkoxyacetic acid having the formula R—O—CH$_2$COOH wherein R is an alkyl group having more than 5 carbon atoms.

5. In the process of accelerating the rate of drying of autoxidizable coating compositions derived from drying oils, the step which comprises incorporating therewith a heavy metal salt of an alkoxyacetic acid having the formula R—O—CH$_2$—COOH wherein R is an alkyl group having more than 5 carbon atoms.

6. In the process of accelerating the rate of drying of autoxidizable coating compositions derived from drying oils, the step which comprises incorporating therewith a metal salt of an alkoxyacetic acid having the formula R—O—CH$_2$—COOH wherein R is an alkyl group having more than 5 carbon atoms; the metal radicle of which is a member of the group consisting of cobalt, manganese and lead.

7. In the process of accelerating the drying of autoxidizable oleo-resinous coating compositions, the step which comprises incorporating therewith a polyvalent metal salt of an octyloxyacetic acid.

8. In the process of accelerating the drying of autoxidizable coating compositions derived from drying oils, the step which comprises incorporating therewith a heavy metal salt of an octyloxyacetic acid.

9. In the process of accelerating the drying of autoxidizable coating compositions derived from drying oils, the step which comprises incorporating therewith a metal salt of an octyloxyacetic acid the metal radicle of which is one of the group consisting of cobalt, manganese and lead.

10. In the process of accelerating the drying of autoxidizable resinous coating compositions the step which comprises incorporating therewith a heavy metal salt of capryloxyacetic acid.

11. In the process of accelerating the drying of autoxidizable drying oil type coating compositions the step which comprises incorporating therewith a polyvalent metal salt of an alkoxyacetic acid made from any of the alcohols boiling above 157° C., which are obtained as a by-product in the production of synthetic methanol from hydrogen and carbon monoxide; said alkoxyacetic acids having the formula R—O—CH$_2$—COOH wherein R is an alkyl group higher than amyl.

12. A coating composition containing a polyvalent metal salt of an acid having the formula R—O—CH$_2$—COOH wherein R is one of the group consisting of alkyl radicles having more than five carbon atoms; a hydroaromatic radicle; and an aryl group bearing at least one alkyl side chain substituent which has more than four carbon atoms in a normal straight chain.

13. A coating composition containing as a siccative a heavy metal salt of an acid having the formula R—O—CH$_2$—COOH wherein R is one of the group consisting of alkyl radicles having more than five carbon atoms; a hydroaromatic radicle; and an aryl group bearing at least one alkyl carbon atom in a normal straight chain.

14. A composition adapted for use as a coating material containing an autoxidizable resinous substance and a heavy metal salt of an alkoxyacetic acid having the formula R—O—CH$_2$—COOH wherein R is an alkyl group having more than five carbon atoms.

15. A composition adapted for use as a coating material containing an autoxidizable oleoresinous substance and a metal salt of an alkoxyacetic acid having the formula

R—O—CH$_2$—COOH wherein R is an alkyl group having more than five carbon atoms; the metal radicle of which is a member of the group consisting of cobalt, manganese, and lead.

16. A composition adapted for use as a coating material containing an autoxidizable oleoresinous substance and a polyvalent metal salt of an octyloxyacetic acid.

17. A coating composition containing an autoxidizable oily glyceride in combination with resin and solvent and a heavy metal salt of an acid of the formula

R—O—CH$_2$—COOH wherein R is an alkyl group having more than five carbon atoms.

18. A composition of matter comprising an autoxidizable coating composition to which a siccative has been added, said siccative being a heavy metal salt of an alkoxyactic acid derived from any of the monohydric alcohols boiling above 157° C. which are obtained as a by-product in the production of synthetic methanol from hydrogen and carbon monoxide.

19. A composition of matter comprising an autoxidizable coating composition to which a siccative has been added, said siccative being a metal salt of an alkoxyacetic acid boiling substantially at 150–165° C. under 29 m.m. mercury pressure, said acid being derived from the monohydric alcohols boiling substantially at 157–220° C. which are obtained as a by-product in the production of synthetic methanol from hydrogen and carbon monoxide; the metal radical of which is one of the group consisting of cobalt, manganese, and lead.

20. A composition of matter comprising an autoxidizable coating composition to which a siccative has been added, said siccative being a lead salt of an alkoxyacetic acid having the formula R—O—CH$_2$—COOH wherein R is an alkyl group containing more than five carbon atoms.

21. A composition of matter comprising an autoxidizable coating composition to which a siccative has been added, said siccacetic acid having the formula

R—O—CH$_2$—COOH wherein R is an alkyl group containing more than five carbon atoms.

22. A composition of matter comprising an autoxidizable coating composition to which a siccative has been added, said siccative being a cobalt salt of an alkoxyacetic acid having the formula

R—O—CH$_2$—COOH wherein R is an alkyl group containing more than five carbon atoms.

HERMAN ALEXANDER BRUSON.

CERTIFICATE OF CORRECTION.

Patent No. 1,920,160.　　　　　　　　　　　　　　　　July 25, 1933.

HERMAN ALEXANDER BRUSON.

It is hereby certified that error appears in the printed specification of the above numbered patent requiring correction as follows: Page 1, line 56, for "or" second occurrence read "of"; and line 94, for "monyl" read "nonyl"; page 2, line 9, for the syllable "inso-" read "iso-"; page 4, after line 109, claim 21, insert the syllable and words "cative being a manganese salt of an aloxy-"; and that the said Letters Patent should be read with these corrections therein that the same may conform to the record of the case in the Patent Office.

Signed and sealed this 29th day of August, A. D. 1933.

M. J. Moore.

(Seal)　　　　　　　　　　　　　　　　　　Acting Commissioner of Patents.